US005221837A

United States Patent [19]

Walgren et al.

[11] Patent Number: 5,221,837

[45] Date of Patent: Jun. 22, 1993

[54] NON-CONTACT ENVELOPE COUNTER USING DISTANCE MEASUREMENT

[75] Inventors: Michael P. Walgren, Manassas; Sarah Crall, Fairfax; Murray L. Kopit, Sterling, all of Va.; Wah Sheck, Olney, Md.

[73] Assignee: Faraday National Corporation, Chantilly, Va.

[21] Appl. No.: 858,639

[22] Filed: Mar. 27, 1992

[51] Int. Cl.[5] ................................................ G01V 9/04

[52] U.S. Cl. .................................... 250/222.1; 377/53

[58] Field of Search .................. 250/222.2, 222.1, 224; 235/98 C; 377/53

[56] References Cited

U.S. PATENT DOCUMENTS

| | | |
|---|---|---|
| Re. 27,869 | 1/1974 | Willits et al. . |
| 3,422,274 | 1/1969 | Coan . |
| 3,581,067 | 5/1971 | Willits et al. . |
| 3,661,431 | 5/1972 | Wisecarver . |
| 3,663,803 | 5/1972 | Mohan et al. . |
| 3,692,980 | 9/1972 | Getker et al. . |
| 3,790,759 | 2/1974 | Mohan et al. . |
| 3,813,523 | 5/1974 | Mohan et al. . |
| 3,835,306 | 9/1974 | Bills et al. . |
| 4,149,319 | 4/1979 | Nelle . |
| 4,232,218 | 11/1980 | Kenton et al. . |
| 4,373,135 | 2/1983 | Mohan et al. . |
| 4,384,195 | 5/1983 | Nosler . |
| 4,547,674 | 10/1985 | Pryor et al. . |
| 4,694,474 | 9/1987 | Dorman et al. . |
| 4,771,443 | 9/1988 | Mohan et al. . |
| 4,807,263 | 2/1989 | Ohno et al. ...................... 250/222.2 |
| 4,828,367 | 5/1989 | Curbelo et al. . |
| 4,846,589 | 7/1989 | Chikuma et al. . |
| 4,868,901 | 9/1989 | Kniskern et al. ................ 250/222.2 |
| 4,912,317 | 3/1990 | Mohan et al. . |
| 4,978,845 | 12/1990 | Hill . |
| 4,994,666 | 2/1991 | Higgison et al. . |
| 4,995,060 | 2/1991 | Hill . |
| 5,005,192 | 4/1991 | Duss . |
| 5,017,773 | 5/1991 | Sato . |
| 5,040,196 | 8/1991 | Woodward . |
| 5,046,076 | 9/1991 | Hill . |
| 5,082,363 | 1/1992 | Nakanishi et al. . |
| 5,087,119 | 2/1992 | Kaneko et al. . |

FOREIGN PATENT DOCUMENTS

| | | |
|---|---|---|
| 61-272892 | 12/1986 | Japan . |
| 1-321593 | 12/1989 | Japan . |
| 2-168372 | 6/1990 | Japan . |
| 2-291090 | 11/1990 | Japan . |

OTHER PUBLICATIONS

"MQ Laser Analog Sensor (Class I/Class IIIb)", Technical Manual, Aromat, 1989.

*Primary Examiner*—David C. Nelms
*Assistant Examiner*—K. Shami
*Attorney, Agent, or Firm*—Oliff & Berridge

[57] ABSTRACT

A counter for counting objects in a stack employs a beam moved by a scan carriage along an edge of the stack. A detector on the carriage determines the position of the portion of the beam reflected by the stack and determines, by optical triangulation techniques, the distance between the source of the beam and the edge of the stack. The resulting signal is used to recognize the presence of objects in the stack and to count them on the basis of this recognition.

19 Claims, 6 Drawing Sheets

NON-CONTACT ENVELOPE COUNTER USING DISTANCE MEASUREMENT

BACKGROUND OF THE INVENTION

1. Field of the Invention

This invention relates to non-contact counters for counting the number of objects in a stack. The invention has particular utility for counting relatively irregular stacked objects, such as stuffed mailing envelopes 2. Description of Related Developments Bulk mailing operations require highly accurate accounting of objects being mailed for job control and billing purposes. Such counts are especially important when mailing credit cards because of the need to maintain security against unauthorized use of such cards In a typical mailing operation for credit cards, several thousand cards per day are mailed as replacements to existing customers or new cards to new customers At such volumes, manual counting of the cards is expensive and unreliable. To accomplish fast and accurate counting of credit cards, highly accurate card counters have been developed. In general, these counters scan one of the edges of a stack of cards and count them by sensing momentary differences in reflected light intensity between the card edges and the space between cards. U.S. Pat. Nos. 27,869, 3,790,759, 3,813,523, 4,373,135, 4,771,443 and 4,912,317 disclose such card counters While such systems provide fast and accurate counting of stacks of credit cards, that have well defined, substantially uniform edges which can be arranged in a highly regular, coplanar fashion, such systems do not provide a means for counting irregularly shaped objects, such as stuffed envelopes. Thus, in a typical credit card bulk mailing process, a cost effective machine counting of the cards can be maintained only up until the point that the cards are loaded or stuffed into envelopes. Thereafter, accountability for the cards by counting of the loaded envelopes becomes a much slower, more expensive, and more unreliable part of the accountability system. This is so because the loaded envelopes are irregular in shape and do not present a uniform, substantially planar edge array that yields a signal of sufficient quality to be used for counting purposes.

One system for counting stacks of bound booklets is illustrated in Japanese Published Patent Application 61-272892. In this design, to improve the accuracy of the count, a vibrating stacker is used for aligning up the booklets on a booklet stand prior to counting. Such an arrangement involves expense in the design and control of the vibrating stand and unnecessary delays in counting. Moreover, booklets are of substantially uniform thickness and can give a relatively uniform signal response to detection. Such as system is less useful for counting a stack of envelopes of varying thickness, for example, ones that contain differing numbers of credit cards.

SUMMARY OF THE INVENTION

It is an object of this invention to provide a counter for the non-contact counting of objects.

It is a further object of this invention to provide a non-contact counter that accurately counts irregularly shaped objects at high speed.

It is further an object of the invention to provide a counter for counting envelopes, particularly envelopes that have been stuffed and are ready for mailing.

These and other objects of the invention are achieved by an apparatus and method wherein a stack of objects, such as envelopes, are arranged with commonly aligned edges to present an edge array. The edge array is scanned by a radiant energy source and, during scanning, the distance between the radiant energy source and the surface of the edge array is measured. Such measurement can be carried out by optical triangulation techniques. On the basis of such distance measurement, the presence of an object in the stack can be determined.

DESCRIPTION OF PREFERRED EMBODIMENTS

The following description of the invention is in the context of a counter for counting envelopes. However, the invention can be utilized for counting other stacked objects, particularly objects of varying shape, size and edge configurations.

Figure 1:
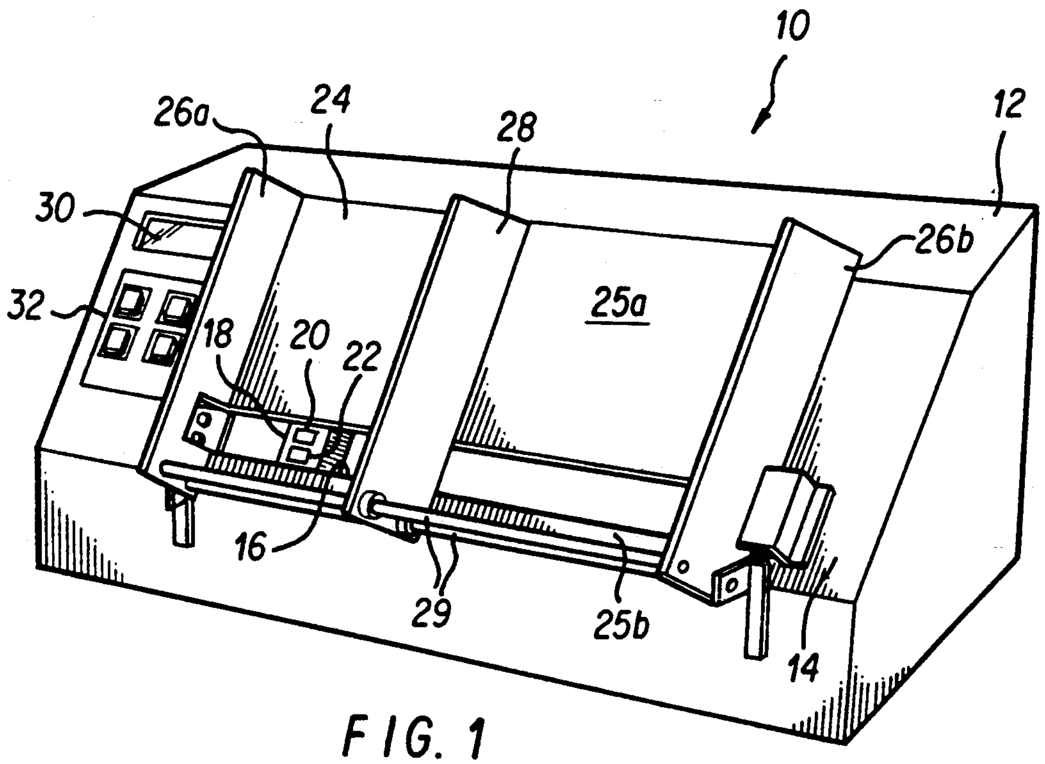
FIG. 1 is a perspective view of a counter.

Referring to FIG. 1, the counter 10 includes a housing 12 having a sloping front face 14. The front face 14 includes an elongate scanning slot 16 extending in the longitudinal direction of the front face 14.

Figure 2:
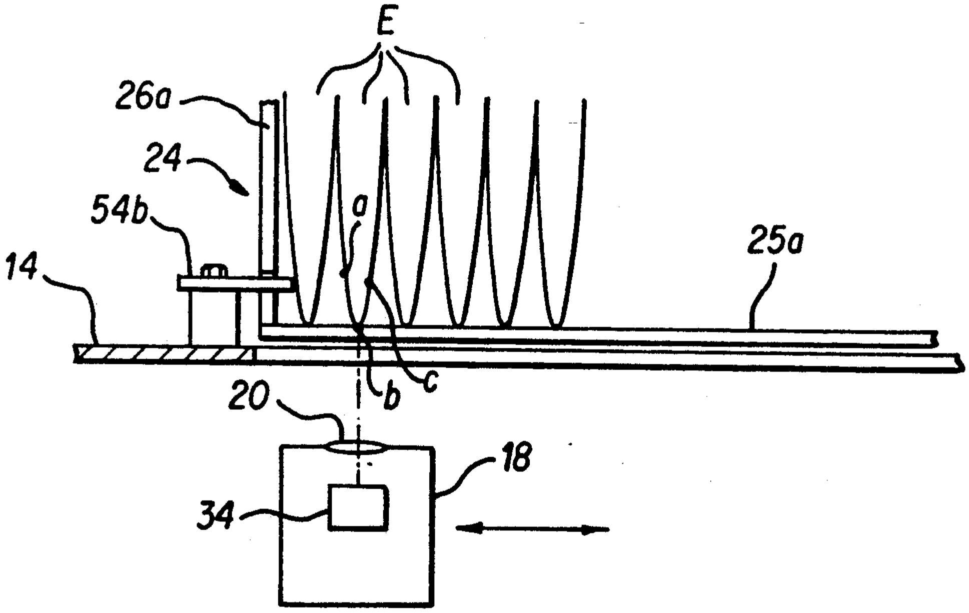
FIG. 2 is a partial schematic view of the scanning arrangement of the counter shown in FIG. 1.

A scanning carriage 18 is mounted within the housing 12 for movement along and beneath the scanning slot 16. The carriage 18 is mounted in a manner to provide accurate and substantially unvarying location of the distance between the face of the carriage and the slot 16. For example, a pair of V-shaped rails (not shown) flanking the edges of the slot 16 may be utilized for accurately positioning the carriage. Referring to FIG. 2, the carriage 18 is moved alternately in the directions of the solid arrow by a suitable drive system (not shown) along the slot 16. The carriage 18 includes a radiation source window 20 and a radiation detector window 22, described in more detail below.

The counter 10 includes a stacking or aligning member 24 that is pivoted by suitable means, such as one of two track rods 29, along the bottom edge of the front face 14. The aligning member 24 includes a first aligning surface 25*a* and a second aligning surface 25*b* and a pair of upstanding, opposed end plates 26*a*, 26*b*. The aligning member 24 also includes a movable plate 28 mounted on a pair of track rods 29. A suitable securing means, such as a friction clamp (not shown) is mounted on the plate 28 and provides for locking the plate 28 at any desired position along the track rods 29. The aligning member 24 is positionable in one of two alternate positions, the first being as shown in FIG. 1 wherein the aligning member 24 rests against the front surface 14 with the aligning surfaces 25*a* and 25*b* each disposed on opposed sides of the scanning slot 16. In a second position, the aligning member is pivoted away from the front face 14 and extends in a substantially horizontally fashion from the housing 12. The stacking member 28 holds objects, such as envelopes, in a stacked condition to be counted by the counter 10.

The counter 10 includes a visual display 30 for displaying a count and a control panel 32, which includes manually actuable switches for controlling operation of the counter.

FIG. 2 shows a plurality of envelopes E forming a horizontally extending stack of envelopes. The envelopes E are stacked edgewise along the surfaces 25*a* and 25*b* and are maintained in a substantially vertical condition between end plate 26*a* and movable plate 28 (shown in FIG. 1). Thus the envelopes present an edge array extending along the aligning member 24.

Figure 3:
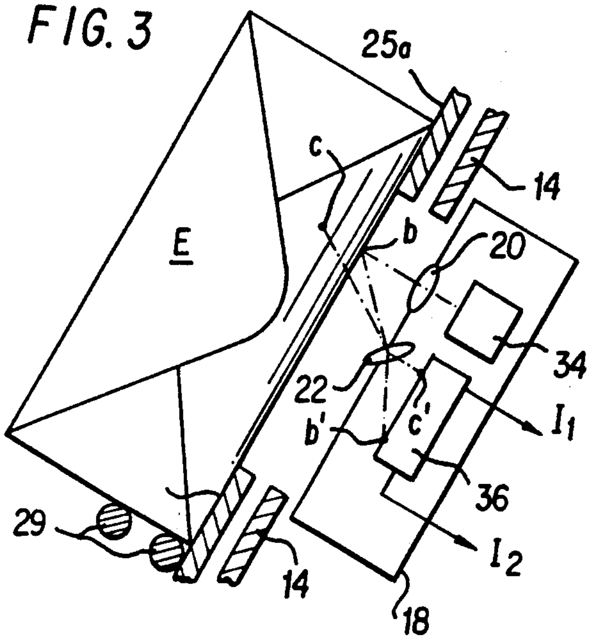
FIG. 3 is a schematic view of the scanning arrangement shown in FIG. 2 taken in a scanning direction.

As illustrated in FIGS. 2 and 3, the scanning carriage 18 moves beneath the edge array of envelopes E. Mounted on the carriage 18 is an optical distance measuring system. The system includes a semi-conductor laser 34 that projects a beam of radiation through the lens or window 20 onto the edge array of envelopes E. An optical triangulation measurement system measures the distance between the laser 34 and the point of impingement of the laser beam on the edge array of the stack. For example, assuming the scan carriage is moving to the right in FIG. 2, the system measures the distance between the laser 34 and the successive points a, b and c on one portion of the stack. As shown in FIG. 3, the distance measurement is made by optical triangulation techniques. The point of impingement of the beam of the laser 34 on the surface of the edge array is imaged by lens 22 onto a position sensing device 36. By sensing the location of the imaged point of impingement on the position sensor 36, the distance h can be determined. For example, as shown in FIG. 3, when the beam is reflected from the edge of an envelope at location b, the incident beam on the position detector 36 is at b'. As the carriage 18 scans to the position coincident with point c in the edge array, the location of the reflected beam on the position sensor moves to point c'. This position sensing is accomplished by taking a ratio of two output currents $I_1$ and $I_2$ from respective ends of the position sensor 36. Such optical distance measuring or ranging systems are commercially available, one preferred system being supplied by Aromat Corporation under the tradename MQ Laser Analog Sensor. Accordingly, no further explanation of the distance measuring system is necessary other than to note that such systems employ a very narrow beam width which allows the system to "see" the edge of an article, such as an envelope, with high resolution.

Figure 4:
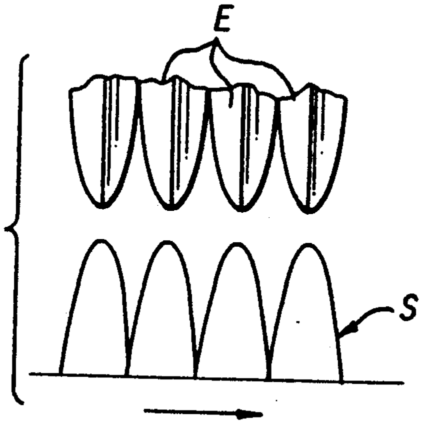
FIG. 4 illustrates the relationship between a segment of the edge array of envelopes and a sensor output signal.

FIG. 4 relates the analog signal S (in idealized form) from the position sensor 36 prior to digital conversion to a segment of the edge array of a stack of envelopes being scanned. The shape of the signal S closely corresponds to the configuration of the edge array, thereby yielding an electronic representation of each item in the stack, which can be counted by data processing techniques described below.

Figure 5:
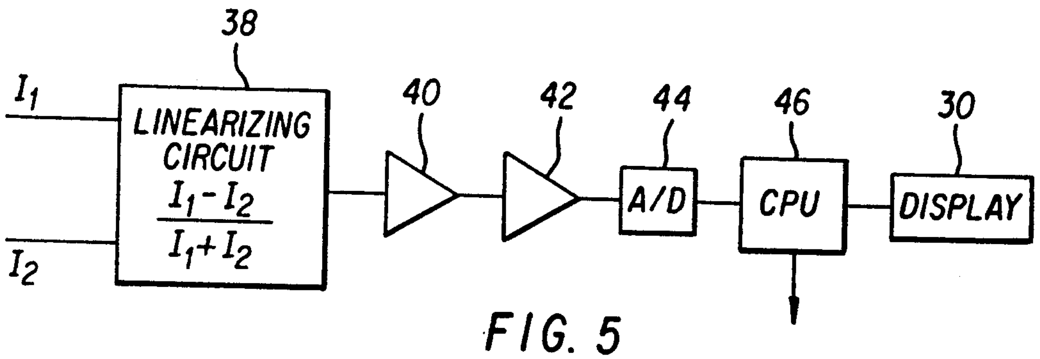
FIG. 5 is a schematic illustration of the major circuit elements of the counter.

As shown in FIG. 5, the two outputs $I_1$ and $I_2$ from the position detecting element 36 are supplied to a linearizing circuit 38 to provide an analog output signal that is proportional to the distance between the laser source and the point of reflection on the edge array. The analog signal is supplied to an op-amp 40, used as a buffer to separate the sensor from the processing electronics. The signal is then supplied to a second op-amp 42 that inverts the signal. The inverted analog signal is supplied to an A/D converter 44 so that the signal can be processed by a digital electronic microprocessor implemented in CPU 46. The CPU 46 performs the signal processing and counting routines necessary for determining a count of the objects being counted and also controls other operations of the counter 10, such as initializing, scanning and displaying. The CPU provides the count to a subsequent downstream user, such as visual display 30.

Figure 6:
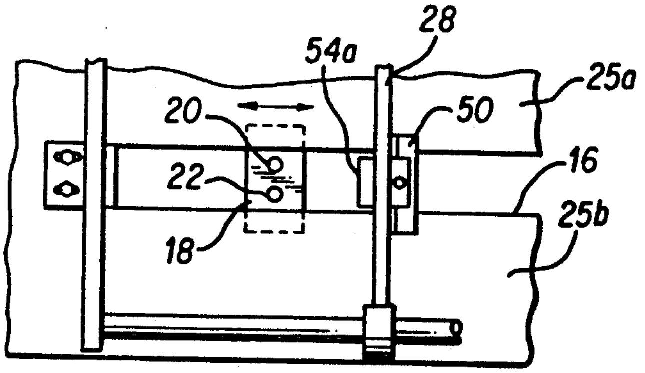
FIG. 6 is a partial plan view of the stacking member.
Figure 7:
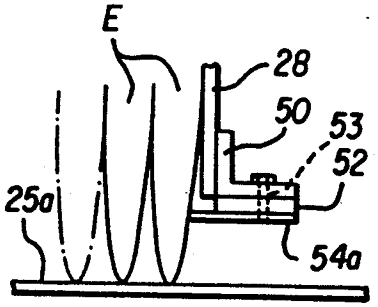
FIG. 7 is a partial side view of the stacking member illustrated in FIG. 6.

Referring to FIGS. 6 and 7, in order to prevent the beam from passing into an undetectable range at the end of a scan cycle, the plate 28 includes structure for engaging the endmost envelope. This arrangement includes a bracket 50 on which is mounted a spacer plate 52 and a blocking plate 54*a*. A pin 53 loosely retains the plate 54*a* loosely on the spacer 52 so that the plate is free to pivot about the pin 53, thus allowing conforming engagement with the end most envelope. A similar plate 54*b* (FIG. 2) is mounted in a fixed position at the left hand end of the slot 16 on face plate 14, extending inwardly at end plate 26*a* to engage the first envelope.

Figure 8:
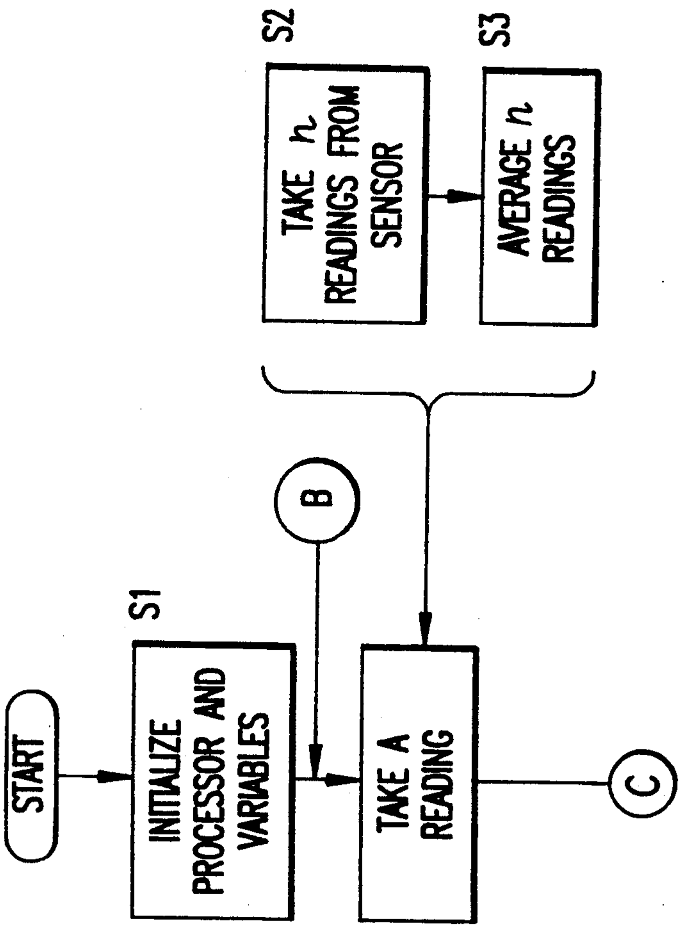
FIG. 8 is a flow diagram of a first embodiment of a counting control system.
Figure 8:
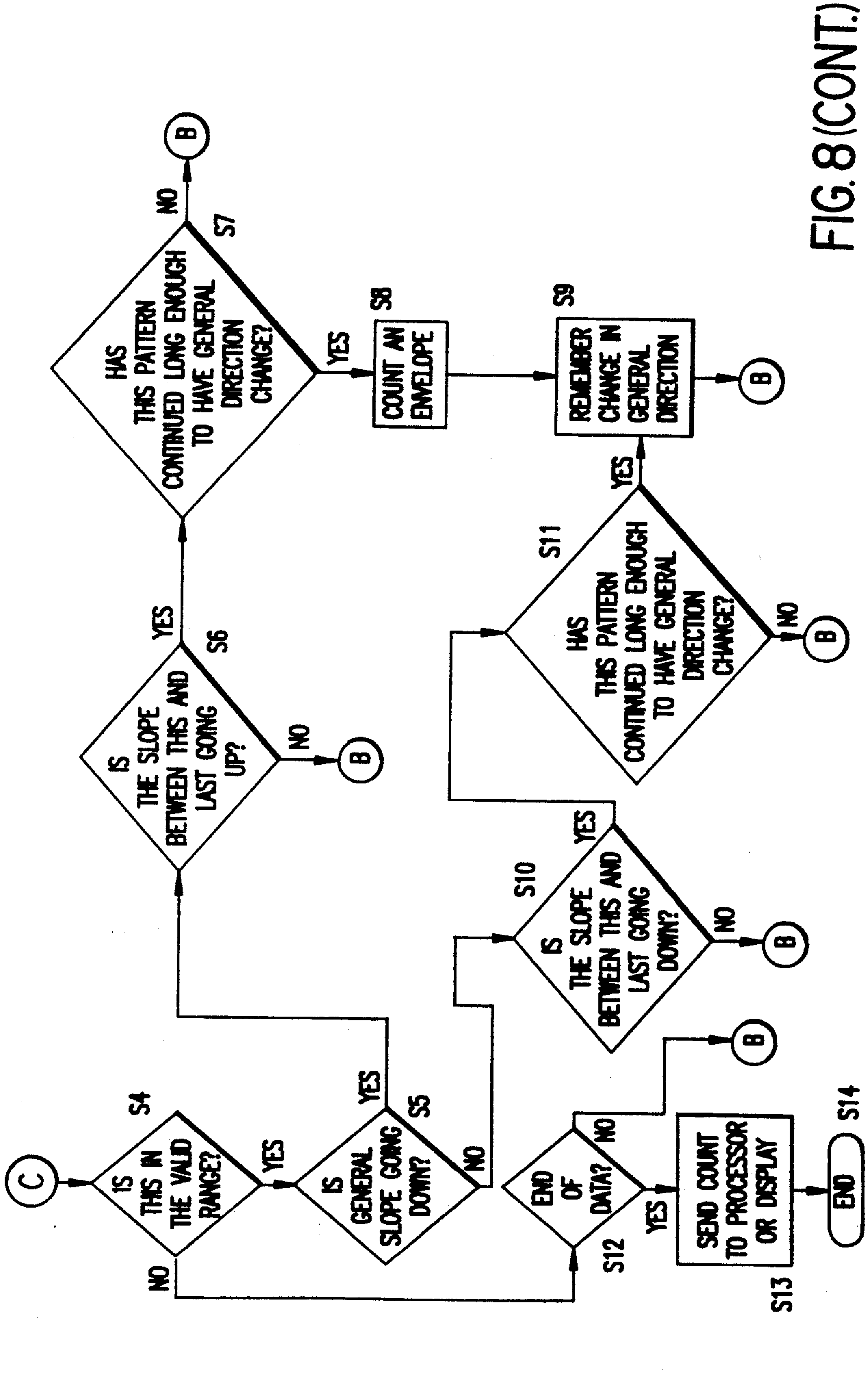

Referring to FIG. 8, a first embodiment of an object recognition and counting system is illustrated. Upon startup of the system, the processing system is initialized in step S1 as the scan of carriage 18 begins. At S2, a predetermined number of readings n are clocked into the microprocessor from the A/D converter 44 and in step S3 the readings are averaged. The number of readings n can vary and is typically about 5. At S4, a determination is made if the average of the readings is within a predetermined range which establishes that the readings are valid. If an affirmative determination is made at S4, processing proceeds to S5. If the determination at S4 is negative, processing proceeds to S12 for a determination of whether the data gathering process has ended.

If the determination at S4 is affirmative, a determination is made at S5 if the general direction of the slope of the waveform is going down, i.e., is negative. If an affirmative determination is made at S5, an inquiry is made at S6 whether the direction of the slope is positive. If an affirmative determination is made at S6, at S7 a determination is made if the positive pattern has continued over a sufficient number of readings to indicate a general direction change in the slope. If an affirmative determination is made at S7, a count in an accumulator is incremented by 1 in step S8 and at step S9, a flag is set to indicate the present general slope direction. Alternately, S8 can occur after S11, described below.

A negative determination at step S5 causes the processing to flow to S10 wherein a determination is made of whether the slope between the present reading and the last reading has turned negative. If an affirmative determination is made at S10, processing proceeds to S11, in which a determination is made as to whether the pattern has continued long enough to indicate a general direction change. If an affirmative determination is made at S11, processing proceeds to S9 to set a flag indicating a change to a negative slope. At step S9, processing proceeds to point B wherein the next subsequent reading is taken. Similarly, negative determinations at step S6, S7, S10 and S11 cause processing to resume at B.

At S12, if an affirmative determination is made that an end to all possible data has been achieved, the processing proceeds to step S13 wherein the count accumulated at S8 is sent to a further user such as a processor or a display. An end of data determination can be made at S12 on the basis, for example, of the carriage 18 being at the end of scan position at which a plurality of successive out of range readings are detected, indicating that the end of the scan path has been reached.

In this processing arrangement, at step S8, a count of 1 is added to the accumulated count, since it is the spaces between envelopes that were counted in this routine.

Figure 9:
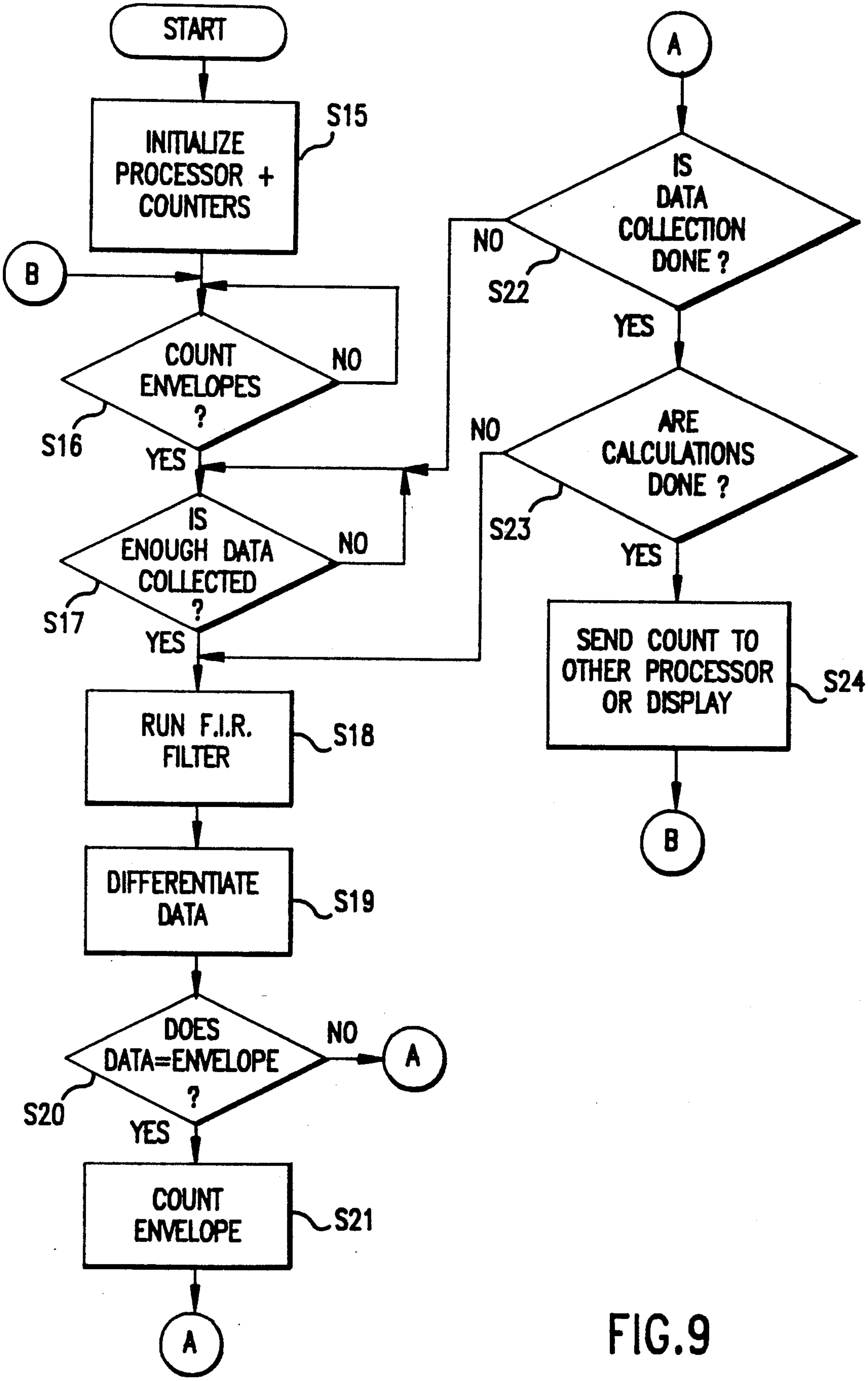
FIG. 9 is a flow diagram of a second embodiment of counting control system.
Figure 9A:
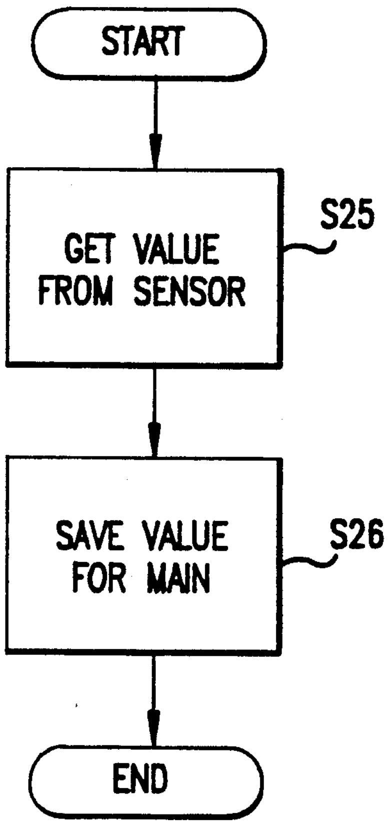
FIG. 9A is a flow diagram of a portion of the counting control system of FIG. 9.

In FIG. 9, a second embodiment of a counting process implemented in CPU 46 is shown. This arrangement uses an interrupt process (shown in FIG. 9A) which is run at a predetermined frequency, for example 600 Hz, to collect data from the position sensor 36 at equal time intervals. This interrupt routine is triggered by a system clock (not shown) and includes step S25, at which a value is read from the sensor 36 and S26 where the value read in S25 is entered into a memory for later processing by the main processing routine.

In the second embodiment, the system is initialized at S15. Processing then flows to S16 at which it is determined if envelopes should be counted. If the counter is in a count mode, an affirmative determination is made at S16 and processing flows to S17 to determine if sufficient data has been collected for processing. In this step, the values stored in memory at S26 are interrogated to determine if a sufficient number of data points have been collected for processing. Typically, 15 to 20 data points are preferred for processing. If the determination at S17 is negative, the interrogation continues until a sufficient number of data points are collected in S26. If the determination at S17 is affirmative, processing continues to S18. At S18 the data is processed to remove high frequency noise. One preferred technique is to use a finite impulse response filter to eliminate such high frequency noise. The coefficients for the filter are determined on the attributes of the desired output signal such as bandwidth, frequency, etc. Techniques for determining such coefficients are known and can be determined, for example, by use of the McClellan-Parks algorithm. The data signal resulting after processing at S18 has high frequency noise substantially eliminated and peaks and troughs in the waveform are smoothed.

At S19, the filtered digital signal resulting from S18 is differentiated to determine the points of slope change in the data signal. In a normal counting routine, the points of slope change indicate the location of an edge of an envelope. After differentiation, the processing flows to S20 wherein a determination is made of whether the data represents the presence of an envelope. At this step, a two or three step interrogation is made to determine if the slope of the data signal has changed, if a second reading confirms that the slope has changed and, depending upon signal characteristics of the detection system, if the data is above a minimum threshold level, indicating that an edge of an envelope has been detected. If an affirmative determination is made at S20, processing proceeds to S21 wherein an envelope is counted and added to an accumulating register.

If the determination at S20 is negative, processing proceeds to S22 to determine if data collection is complete, i.e. that the scan cycle has ended. If a negative determination is made at S22, processing returns to S17 to continue data collection. If an affirmative determination is made at S22, processing proceeds to S23 for a determination of the completion state of the counting calculations. An affirmative determination at S23 results in a process flow to S24, wherein the accumulated count is sent to a downstream processor or display. In the event a negative determination is made at S23, processing flows to S18 to continue processing of unprocessed data.

The second embodiment of counting method has significant advantages over the first embodiment because only two data samples are necessary to determine a slope change. As a result, the same processing routine can be used to count envelopes having wide variations in thickness. In addition, because the samples are taken at equal intervals, the signal more closely represents the pattern of the envelopes.

To provide higher accuracy, two distance measuring systems can be mounted on carriage 18, each employing its own counting system. The counts of systems can be compared at the end of each scan. If the same count is not made by each system, remedial action, such as a recount, can be taken.

Counters made in accordance with the present invention have significant advantages resulting from the distance measuring arrangement disclosed. High speed, reliable machine counting of variably shaped items, such as envelopes, can be accomplished. The distance measuring sensor has an improved depth of field over reflectance type arrangements and is less susceptible to counting errors resulting from misalignment of items being counted. The use of an arrangement that provides a signal proportional to the changing distance measured enables simplification of signal processing while yielding highly reliable data. The signal has high resolution and is more easily detectable, especially in comparison to systems that rely on detecting intensity of reflected radiation.

While the invention has been described with reference to the structures disclosed, it is not confined to the details set forth but is intended to cover such modifications or changes as may come within the scope of the following claims.

What is claimed is:

1. A counter for counting stacked objects comprising:

a stacking member for disposing a stack of a plurality of objects with an edge of each object forming an edge array;

a radiation source for directing a beam of radiant energy toward the edge array;

means for effecting relative movement between the radiation source and the edge array, whereby the beam scans the edge array;

a detector for receiving at least a portion of the beam of radiation reflected from the edge array, the detector including a sensor for providing an output proportional to the position at which the reflected portion of the beam is received on the sensor and means for determining from said output the distance between the radiation source and the point of reflection of the beam from the edge array and providing a signal representative of said distance and the beam scans the edge array;

determining means for receiving the signal and determining from the signal the presence of an object by detecting a change in slope of the signal from a first direction to a second direction, independently of comparison with a slope threshold signal; and means responsive to said determining means for counting the number of objects in the stack.

2. A counter as in claim 1, wherein the radiation source comprises a laser.

3. A counter as in claim 2, wherein the laser and the detector are mounted on a movable carriage.

4. A counter for counting stacked objects comprising:

a stacking member for disposing a stack of a plurality of objects with an edge of each object forming an edge array;

a radiation source for directing a beam of radiant energy toward the edge array;

means for effecting relative movement between the radiation source and the edge array, whereby the beam scans the edge array;

a detector for receiving at least a portion of the beam of radiation reflected from the edge array, the detector including a sensor for providing an output proportional to the position at which the reflected portion of the beam is received on the sensor and means for determining from said output the distance between the radiation source and the point of reflection of the beam from the edge array and providing a signal representative of said distance;

determining means for receiving the signal and determining from a plurality of said signals the presence of an object;

means responsive to said determining means for counting the number of objects in the stack; and wherein the stacking member includes an upstanding end support member for retaining the stacked object in an upright position and means extending transversely from the end support member for engaging an object adjacent the support member to block passage of the beam between the end support member and said adjacent object.

5. A counter for counting stacked objects comprising:

a stacking member for disposing a stack of a plurality of objects with an edge of each object forming an edge array;

a radiation source for directing a beam of radiant energy toward the edge array;

means for effecting relative movement between the radiation source and the edge array, whereby the beam scans the edge array;

a detector for receiving at least a portion of the beam of radiation reflected from the edge array, the detector including a sensor for providing an output proportional to the position at which the reflected portion of the beam is received on the sensor and means for determining from said output the distance between the radiation source and the point of reflection of the beam from the edge array and providing a signal representative of said distance;

determining means for receiving the signal and determining from the signal the presence of an object by detecting a change in slope of the signal from a first direction to a second direction, independently of comparison with a slope threshold signal; and means responsive to said determining means for counting the number of objects in the stack; and wherein the beam from the radiation source and the portion of the beam reflected onto the sensor are in a plane substantially normal to the stack direction.

6. A counter for counting stacked objects comprising:

a stacking member for disposing a stack of a plurality of objects with an edge of each object forming an edge array;

a radiation source for directing a beam of radiant energy toward the edge array;

means for effecting relative movement between the radiation source and the edge array, whereby the beam scans the edge array;

a detector for receiving at least a portion of the beam of radiation reflected from the edge array, the detector including means for measuring the distance between the radiation source and a point of reflection of the beam in the edge array and providing signal representative of said distance;

determining means for receiving the signal from the detector and determining from the signal the present of an object by detecting a change in slope of the signal from a first direction to a second direction, independently of comparison with a slope threshold signal; and means responsive to said determining means for counting the number of objects in the stack.

7. A counter as in claim 6, wherein the means for measuring said distance between the radiation source and the edge array comprises means employing an optical triangulation method for determining said distance.

8. Apparatus for counting envelopes comprising:

a member for disposing a stack of a plurality of envelopes with an edge of each envelope forming an edge array;

a radiation source for directing a beam of radiant energy toward the edge array;

means for effecting relative movement between the radiation source and the edge array, whereby the beam scans the edge array;

a detector for receiving at least a portion of the beam of radiation reflected from the edge array, the detector including means for optically determining the distance between the radiation source and a point of reflection of the beam from the edge array and providing a signal representative of said distance as the beam scans the edge array;

determining means for receiving the signal from the detector and determining from the signal the presence of an envelope by detecting a change in slope of the signal from a first direction to a second direction, independently of comparison with a slope threshold signal; and means responsive to the determining means for counting the envelopes in the stack.

9. Apparatus as in claim 8, wherein the radiation source comprises a laser.

10. Apparatus as in claim 9, wherein the detector includes means for determining the distance between the laser and the point of reflection on the edge array comprises means for determining said distance by a triangulation method.

11. Apparatus as in claim 10, wherein the laser and the detector are mounted on a carriage movable with respect to the stack.

12. A method for counting stacked objects comprising the steps of:

arranging a stack of objects to form an edge array;

directing a beam of radiation from a radiation source toward the edge area effecting relative movement between the beam and the edge array in a direction substantially parallel to the edge array;

successively detecting the distance between the source and the edge array by detection of a portion of the beam reflected from the edge array and producing an electrical signal representation of the detected distance;

determining the presence of an object by detecting a change in slope of the signal from a first direction to a second direction, independently of comaprison with a slope threshold signal; and counting an object in response to the determination of the presence of an article made in said determining step.

13. A method as in claim 12, wherein the measuring step comprises optically measuring said distance.

14. A method as in claim 13, wherein the measuring step comprises a triangulation technique.

15. A counter for counting stacked objects comprising:

means for disposing a stack of a plurality of objects with a portion of each object forming an array;

an energy source for directing a beam of energy toward the array;

means for effecting relative movement between the source and the array, whereby the beam scans the array;

a detector for determining from said beam the distance between the source and the point of impingement of the beam from the array and providing a signal representative of the shape of the array;

determining means for receiving the signal and determining from said signal the presence of an object by detecting a change in slope of the signal from a first direction to a second direction, independently of comparison with a slope threshold signal; and means responsive to said determining means for counting the number of objects in the stack.

16. A counter as in claim 15, wherein the detector for determining said distance between the energy source and the array comprises means employing an optical triangulation method for determining said distance.

17. A counter as in claim 16, wherein the energy source comprises a laser.

18. A counter as in claim 16, wherein the energy source and the detector are mounted on a movable carriage.

19. A method as in claim 12, wherein the stacked objects are stuffed envelopes.

* * * * *